United States Patent [19]

Scott

[11] 4,365,815
[45] Dec. 28, 1982

[54] MEANS PROVIDING COOLANT BETWEEN ELEMENTS OF RADIAL FACE SEALS

[75] Inventor: Peter A. J. Scott, Rugby, England

[73] Assignee: Associated Engineering Limited, Warwickshire, England

[21] Appl. No.: 224,366

[22] Filed: Jan. 12, 1981

Related U.S. Application Data

[63] Continuation-in-part of Ser. No. 77,433, Sep. 20, 1979, Pat. No. 4,290,613.

[30] Foreign Application Priority Data

Sep. 22, 1978 [GB] United Kingdom ............... 37715/78
Jan. 11, 1980 [GB] United Kingdom ................ 8001039

[51] Int. Cl.³ .......................... F16J 15/16; F16J 15/34
[52] U.S. Cl. ........................................ 277/22; 277/75; 277/96.1; 277/96.2; 277/3
[58] Field of Search ............. 277/12, 32, 22, 70–72 R, 277/72 FM, 74–76, 78, 79, 237, 96, 3, 96.1, 96.2

[56] References Cited

U.S. PATENT DOCUMENTS

| | | | |
|---|---|---|---|
| 3,411,794 | 11/1968 | Allen | 277/75 X |
| 3,603,599 | 9/1971 | Laird | 277/22 X |
| 3,746,128 | 7/1973 | Wunsch | 277/22 X |
| 4,013,298 | 3/1977 | Bjerk | 277/75 |
| 4,277,072 | 7/1981 | Forch | 277/96.2 |
| 4,290,613 | 9/1981 | Scott | 277/96.1 |
| 4,305,592 | 12/1981 | Peterson | 277/22 X |

FOREIGN PATENT DOCUMENTS

| | | | |
|---|---|---|---|
| 2262667 | 10/1973 | Fed. Rep. of Germany | 277/3 |
| 817454 | 7/1959 | United Kingdom | 277/3 |

Primary Examiner—Robert S. Ward, Jr.
Attorney, Agent, or Firm—Biebel, French & Nauman

[57] ABSTRACT

For cooling the working face of mechanical working elements, such as bearings, rotary seals and friction devices, the cooling fluid flows through a passage which is located behind the working face and contains a porous thermally-conductive mass having interconnecting pores. The conductive material of the porous mass is in intimate thermal contact with the wall behind the working face and acts as a heat exchanger having an extended heat transfer surface. The porous mass preferably comprises a sintered highly-conductive material.

7 Claims, 1 Drawing Figure

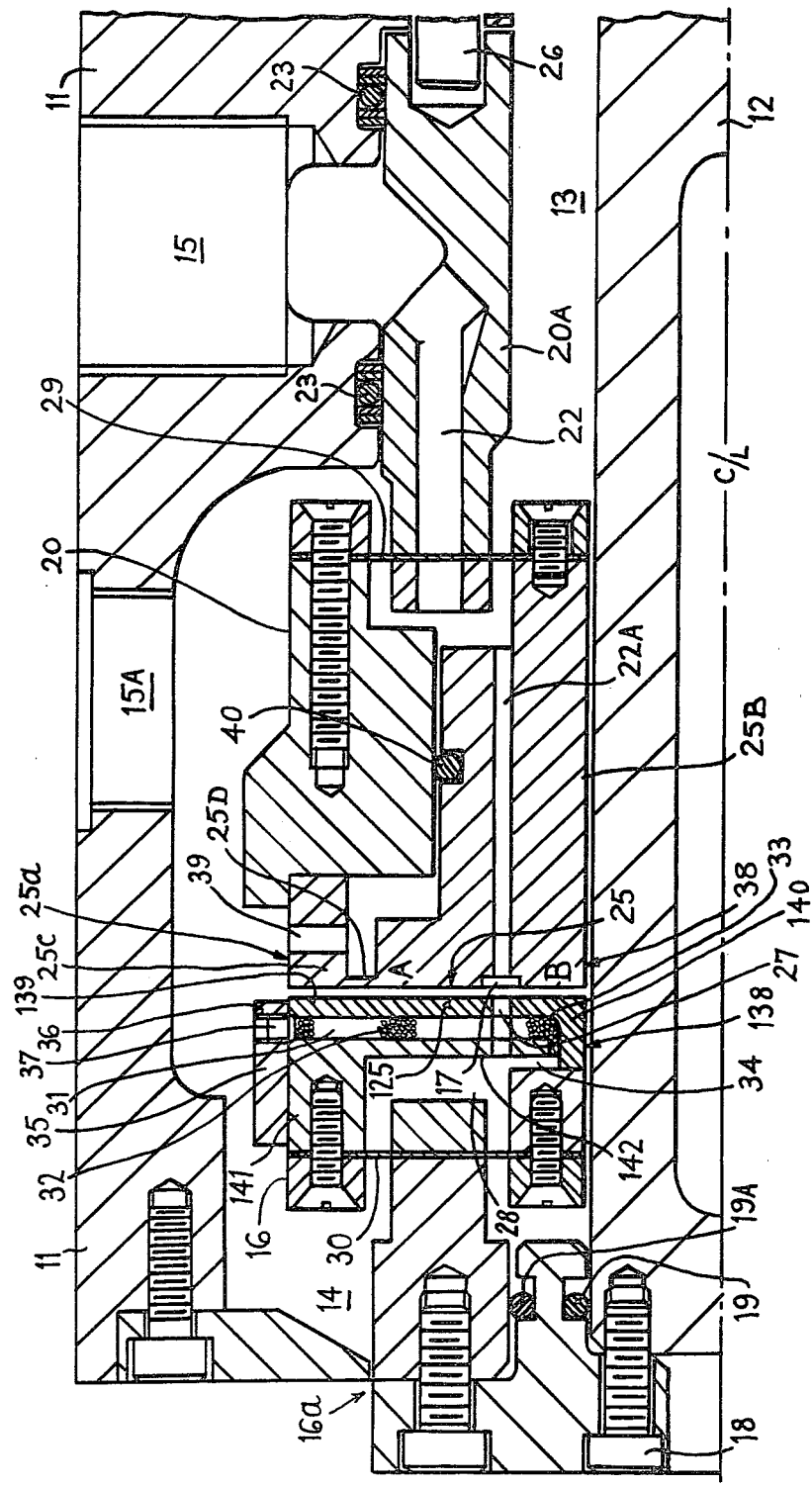

4,365,815

MEANS PROVIDING COOLANT BETWEEN ELEMENTS OF RADIAL FACE SEALS

RELATED CASE

This application is a continuation-in-part of my copending application Ser. No. 77,433 filed Sept. 20, 1979, now U.S. Pat. No. 4,290,613.

FIELD OF THE INVENTION

This invention relates to means for cooling a mechanical working element having a working face at which heat is generated during operation, and is more particularly but not exclusively concerned with means for cooling a working element which forms one of two relatively rotatable sealing faces of a positive clearance radial face seal.

DESCRIPTION OF THE PRIOR ART

In high-speed machinery, such as turbo-compressors, high-speed pumps, turbo-alternators, tyre cord winders and bobbin winders, that is machines where the shaft peripheral speed is of the order of 100 meters per second, the cooling of bearing elements and seals becomes an important part of their design.

A positive clearance radial face seal generates considerable viscous shearing power between its two opposed sealing (working) faces and because of the close operating clearances, the clearance control fluid flow between faces is often of insufficient thermal capacity to act as a sink for this power loss without exceeding a temperature which would permanently alter the properties of the control fluid adversely.

Furthermore, heat generated in the working elements of power clutch couplings and braking system retarders for example can give rise to clutch and brake fade if the heat is not dissipated rapidly.

The heat generated at the working faces of bearings is normally dissipated by flowing cooling fluid through a passage or passages in, or defined in part by, the material behind the working face.

SUMMARY OF THE INVENTION

The present invention has for an object to provide improved means for cooling a working element which overcomes or alleviates the problem of cooling a working element of limited surface area requiring a very high surface heat transfer coefficient.

According to the present invention, apparatus comprising a mechanical working element having a working face at which heat is generated and which is cooled by flowing cooling fluid through a passage defined, at least in part, by the material of the element behind said working face is characterised in that a porous thermally-conducting mass having interconnecting pores is located in said passage and in intimate thermal contact with the said material behind the working face of the element.

Preferably the porous mass is bonded to or integral with the material of the working element, conveniently by sintering the particles or components of the mass together and to the material of the working element.

The cooling means according to the invention provides a compact and extended area for heat transfer. The porous mass may be of a high-conductivity material such as copper.

The cooling means according to the invention has particular application to cooling at least one of the working elements of positive clearance radial face seals, such as described in my aforesaid application No. 77433. To this end the invention also consists in a positive clearance radial face seal comprising two sealing members mounted respectively on relatively rotatable shaft and housing members and each having opposed portions defining annular sealing faces having a radial clearance therebetween forming a communicating path between regions of higher and lower pressures, characterised in that at least one of the sealing members has a cavity behind its sealing face and defined, at least in part, by the portion of the material of the sealing member behind said sealing face, a porous thermally-conductive mass having interconnecting pores located in said cavity and in intimate thermal contact with the material of said portion, and said cavity having inlet means and outlet means for flowing a cooling fluid through the interconnecting pores of the porous mass in the cavity.

BRIEF DESCRIPTION OF THE DRAWING

The drawing is a half-section of a positive clearance radial face seal having two relatively rotatable sealing faces, and incorporating a cooling means according to the invention.

DESCRIPTION OF THE PREFERRED EMBODIMENT

Referring to the drawing, a housing 11 has an opening through which passes a rotatable shaft 12, a seal being provided to prevent or minimise fluid leakage between a region 13 of a fluid at high pressure and a region 14 of a fluid at low pressure. This seal includes a backplate 20 which is mounted, by means of a mounting part 20A thereof, in the housing with a clearance around the shaft 12, and is in sealed engagement with the housing 11 by means of annular sealing rings 23 and is prevented from rotation by a pin 26.

The left-hand end portion of the backplate (as seen in the drawing) constitutes one working element 38 which forms one of two relatively rotatable sealing faces 25 of the positive clearance radial face seal. The sealing face 25 is formed on an annular pressure-deflectable element 25A consisting of rigid radially inner and outer rings 25B, 25C supporting an intermediate elastic portion 25D. The outer ring 25C abuts the left-hand end of backplate 20, but the inner ring 25B is spaced axially away from the backplate 20, and this space behind inner ring 25B and portion 25D is connected to the region 14 at low pressure by hole 39. Part of the inner ring 25B is axially movable in the bore of backplate 20, to which it is sealed by an annular sealing ring 40. The inner annular part of ring 25B extends within the mounting part 20A of the backplate, to which part it is secured by the flexible diaphragm or membrane 29. The latter is such that although it is very stiff in resisting relative radial or circumferential movement of ring 25B with respect to part 20A, it is relatively flexible in the axial direction.

A collar 16 is mounted to rotate with the shaft 12 by means of a mounting part 16A of the collar, and the mounting part 16A being keyed to the shaft by screw-threaded bolts 18 or other suitable means such as pins. The mounting part 16A comprises two portions which are bolted together, and annular sealing rings 19 and 19A prevent leakage between the collar mounting part 16A and shaft 12 and mounting part portions respectively. The collar 16 is also secured to its mounting part 16A by a flexible diaphragm or membrane 30. The right-hand end portion of the collar 16 (as seen in the drawing) constitutes another working element 138 which forms the other face 125 of the two relatively rotatable sealing faces of the seal. Faces 25, 125 are machined radially flat in manufacture.

The face seal operates as described in my aforesaid Application Serial No. 77433 to which reference should be made.

The face seal illustrated in the present application is of the buffer type, and fluid at a higher pressure than that in region 13 is fed through conduit 15 in the housing 11 to passages 22 to 22A in the backplate mounting part 20A and inner ring 25B of the deflectable element respectively and thence to an annular recess 17 between the inner and outer periphery of the faces 25, 125 and through holes 27 in the sealing face 125 to space 28 within the collar 16. There will therefore be a flow of fluid from region 17 radially inward over co-operating areas B of the faces 25, 125 to the region 13, and also a flow of fluid from region 17 radially outward over co-operating areas A of the faces 25, 125 to the region 14. Outwardly flowing buffer fluid is exhausted to drain, and subsequent re-circulation, through a conduit 15A in the housing 11.

In operation of the face seal, owing to the pressure gradients over sealing face areas A and B, the deflectable element 25A will deflect to afford a convergent passage between co-operating areas A of faces 25, 125. The seal is so dimensioned that, in operation, the minimum clearance between the faces 25, 125 occurs at the outer periphery of areas A and is of the order of 0.01 mm. It should be noted that a rebate may be provided near the outer periphery of the sealing faces to accommodate fastening means, e.g. bolt-holes, bolt-heads, etc., and this rebate is set back from the sealing face by a much greater amount than the gap, and therefore the rebated portion does not form part of the sealing face.

The diaphragms 29, 30 provide quasi-static seals between the pressure regions and provide for self-alignment of the seal parts bearing the sealing faces 125, 25. The axial and angular (tilting) stiffness of the diaphragms is chosen to be less than that of the fluid film between the sealing faces 125, 25. It will be appreciated that the pressures acting on the left and right hand ends respectively of the collar 16 and backplate 20 are balanced.

The flow of sealing fluid between faces 25, 125, one of which is rotating at high speed relative to the other, generates a large amount of heat, mainly due to shear of the fluid film.

To dissipate this heat, the arrangement now to be described is employed in the collar 16.

The collar 16 is formed, to the rear of the sealing face 125, with an annular cavity or passage 31 which is filled with a mass 32 of porous sintered material having interconnecting pores and which is integral with the wall 139 on which sealing face 125 is formed. The material of the wall 139 and the sintered mass is of high thermal conductivity, for example of copper or copper alloy. At its radially inner periphery, the annular passage 31 has an axially extending portion 33 which communicates with a radially extending annular passage 34 leading from the space 28 within the collar 16. At its radially outer periphery the passage 31 is covered by a ring 35 having a plurality of circumferentially-spaced radial holes 36 which are aligned with the passage 31 and of which selected ones are closed by plugs 37 for a purpose to be described.

The annular cavity 31 may be filled with the porous mass by tinning annular copper members, pressing them together with copper powder between them, and then sintering. To facilitate this, the collar 16 is made of two ring members 140 and 141, the smaller diameter ring member 140 having a radially outward flange at one end constituting the wall 139 defining the sealing face 125, and the longer diamter ring member 141 having a radially inward flange constituting wall portion 142 of the cavity 31 and of which the inner periphery is spaced from the ring member 140 to provide the passage portion 33 communicating with the space 28 behind the wall 142. The separate parts of the collar may be secured together by screws or any other convenient means, with the sinterable mass sandwiched between the walls 139 and 142.

In operation of the face seal described herein, there is a flow of cooling buffer fluid taken from the annular region 17 through axial holes 27, which can be lined where they pass through the sintered material 32, to the space 28 from whence the buffer fluid flows radially inwardly through passage 34, axially through the inlet passage portion 33 and then radially outwardly through the interconnected pores of the annular mass of sintered material 32 in the passage 31 and out through the unplugged holes 36 in the ring 35 overlying the peripheral gap between the wall 139 and 142 to the low pressure region 14. Thus there is a flow of cooling fluid across the rear of substantially the entire working face 125 of the working element 138 with the sintered annular mass 32 acting as a heat exchanger having an extended heat transfer surface. The portion of the sintered mass 32 in the axial passage 33 ensures that the radially inner corner of the collar 16 is adequately cooled. It will be appreciated that flow through the sintered mass will be determined by the number of radial holes 36 which are closed by the plugs 37. The buffer fluid may be a gas or, as is preferred, a liquid and may itself be cooled at source.

Various modifications may be made without departing from the invention. For example, the cooling means may be located to the rear of the sealing face 25 instead of or as well as in the collar 16.

Further, the mass of porous material need not be sintered; the important conditions are that it has interconnected pores through which the cooling fluid can flow, and that the material is in intimate thermal contact with the material of the working element behind its working face. Thus the mass may comprise small spheres, of say 1.65 mm. diameter, or particles which are coated with brazing metal and, after insertion in the passage, are heated to melt the coating and thus connect the spheres or particles together and to the material of the working element. A small spherical or other particles of a good thermally conducting material may simply be pressed together between the opposed walls of the cooling passage to provide intimate thermal contact between the particles and with the rear of the wall on which the working face is formed.

Although described with reference to a face seal the invention is not limited thereto and may also be used with a thrust or journal bearing or other working element having a working face at which heat is generated during operation.

I claim:

1. A positive clearance radial face seal comprising two sealing members mounted respectively on relatively rotatable shaft and housing members and each having opposed portions defining annular sealing faces having a radial clearance therebetween forming a communicating path between regions of higher and lower pressures, wherein at least one of the sealing members has a cavity behind its sealing face and defined, at least in part, by the portion of the material of the sealing member behind said sealing face, a porous thermally-conductive mass having interconnecting pores located in said cavity and in intimate thermal contact with the material of said portion, and said cavity having inlet means and outlet means for flowing a cooling fluid through the interconnecting pores of the porous mass in the cavity.

2. A seal according to claim 1, wherein said at least one sealing member comprises a collar comprising two ring members of different diameters, the smaller diameter ring member having a radially outward annular flange at one end constituting a first wall portion defining the sealing face and the larger diameter ring member having a radially inward annular flange constituting a second wall portion which, when the rings are assembled to form the collar, is spaced from the rear face of said first wall portion to form said cavity behind said first wall portion and is also spaced at its inner periphery from the smaller diameter ring member to provide said inlet means communicating with a space in the collar behind the second wall portion, and, wherein the porous mass in the cavity comprises sintered material, and means are provided for admitting cooling fluid to the space in the collar behind the second wall portion to flow through the inlet means and radially outward through the porous mass to the outlet means comprising the outer peripheral gap between the first and second wall portions.

3. A seal according to claim 2, wherein said outlet means includes circumferentially spaced holes in a ring overlying said peripheral gap, and means for closing selected ones of said holes.

4. A seal according to claim 2, wherein said at least one sealing member is the rotatable sealing member of the seal, and cooling fluid is admitted to said space in the collar behind the second wall portion by way of holes extending from the sealing face of the first wall portion through said first wall portion, the porous mass and the second wall portion, the ends of the holes in said sealing face rotating opposite a recess in the sealing face of the stationary sealing member to which the cooling fluid is fed through the stationary sealing member.

5. A seal according to claim 2, wherein the sealing face of the other sealing member comprises a pressure-deflectable elastic or elastically-loaded element which initially provides a substantially planar sealing face in the radial direction and which deflects, in the steady state operating condition, to provide a clearance between the sealing faces which converges in the radial direction to a minimum clearance at the downstream zone of the seal, the deflection changing with variations in the operating conditions in a manner to increase the convergence in the radial direction towards said downstream zone of the seal under the action of increased load on the seal tending to restore said steady state minimum clearance.

6. A seal according to claim 5, wherein the deflectable element comprises an annular flexible element having reinforcing rigid annular portions extending around its internal and external peripheries respectively, one of said rigid annular portions being secured adjacent one periphery of the end face of a mounting member of said other sealing member and the other said rigid annular portion is slidable relative to and sealed against the said mounting member, the space between the intermediate flexible annulus of the deflectable element and the end face of the mounting member being vented to the low pressure region of the seal.

7. A seal according to claim 4, wherein the cooling fluid is admitted at a pressure greater than that of the fluid in the high pressure region of the seal and also acts as a buffer fluid.

* * * * *